Figure 1:
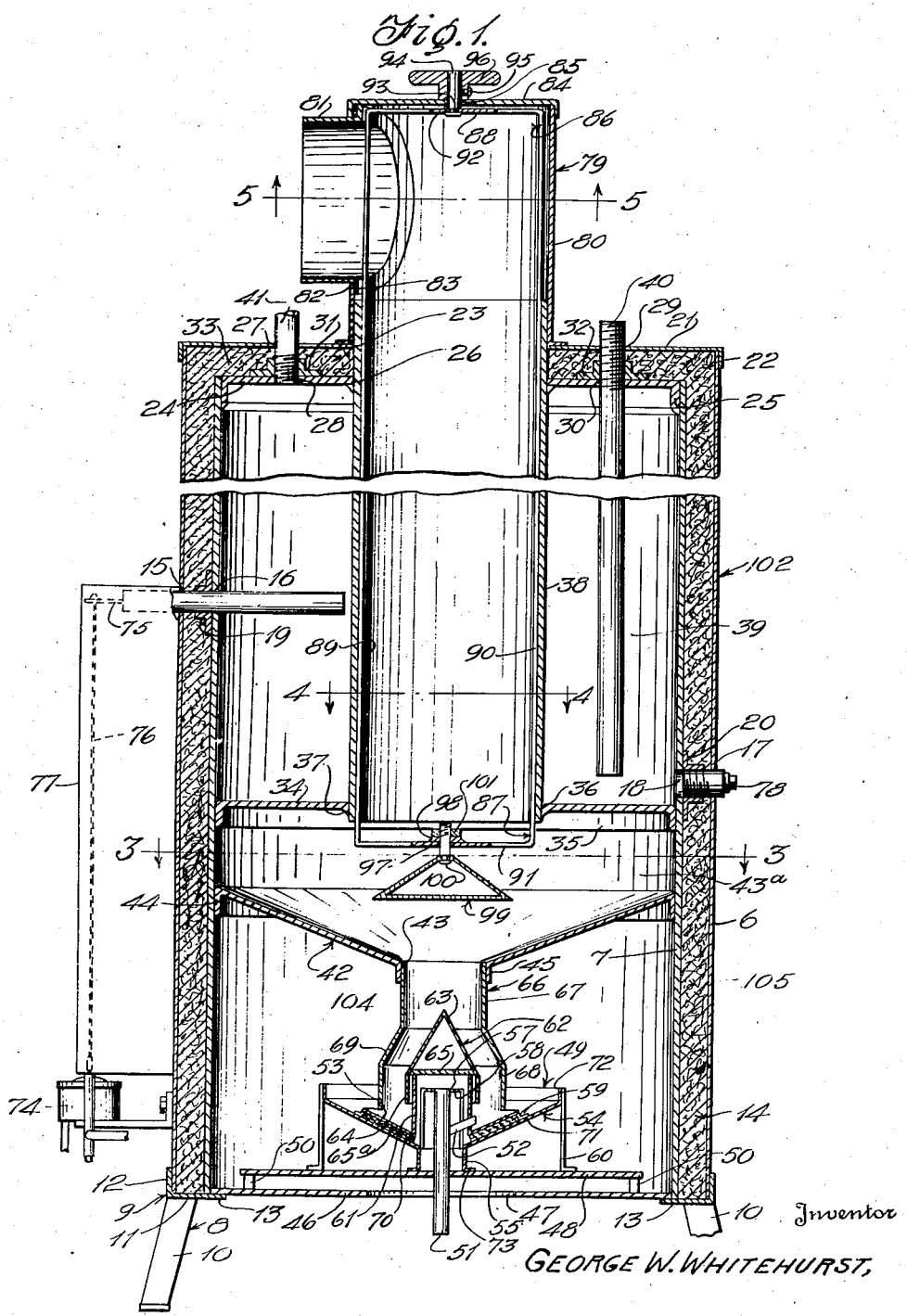

June 6, 1939.  G. W. WHITEHURST  2,160,994

HOT WATER HEATER

Filed Oct. 20, 1937   2 Sheets-Sheet 1

Inventor
GEORGE W. WHITEHURST,

By Kimmel & Crowell,
Attorneys

June 6, 1939. G. W. WHITEHURST 2,160,994
HOT WATER HEATER
Filed Oct. 20, 1937 2 Sheets-Sheet 2

Inventor
GEORGE W. WHITEHURST,
By Kimmel & Crowell,
Attorneys.

Patented June 6, 1939

2,160,994

UNITED STATES PATENT OFFICE 2,160,994

HOT WATER HEATER

George W. Whitehurst, Portsmouth, Va.

Application October 20, 1937, Serial No. 170,080

9 Claims. (Cl. 122—17)

This invention relates to a hot water heater.

The invention aims to provide, in a manner as hereinafter set forth, a heater of the class referred to including a heat conducting flue and with the heater so constructed whereby the soot accumulated on the wall of the flue may be conveniently and expeditiously removed therefrom and consumed.

The invention further aims to provide, in a manner as hereinafter referred to including a water tank or compartment, a heat conducting flue disposed axially of and extending through the tank, a heat generating means arranged below the tank and flue, and revoluble means suspended in the flue for removing accumulated soot from the wall of the latter in a manner whereby it will gravitate into the combusted means and be consumed.

The invention further aims to provide, in a manner as hereinafter set forth, a hot water heater which is comparatively simple in its construction and arrangement, strong, durable, compact, thermostatically controlled, thoroughly efficient in its use, having arranged therein and as a permanent part thereof means for expeditiously removing the accumulated soot on the wall of the heat conducting flue, consuming therein the removed soot, readily assembled and comparatively inexpensive to set up.

To the above ends essentially and to others which may hereinafter appear the invention consists of the novel construction, combination and arrangement of parts as will be more specifically described and illustrated in the accompanying drawings wherein is shown an embodiment of the invention, but it is to be understood that changes, variations and modifications may be resorted to which fall within the scope of the invention as claimed.

Figure 2:
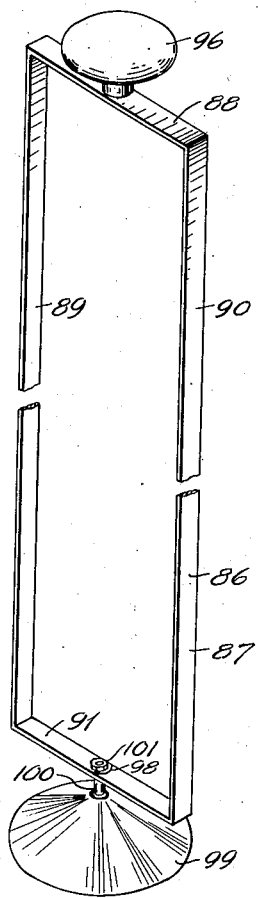
Figure 3:
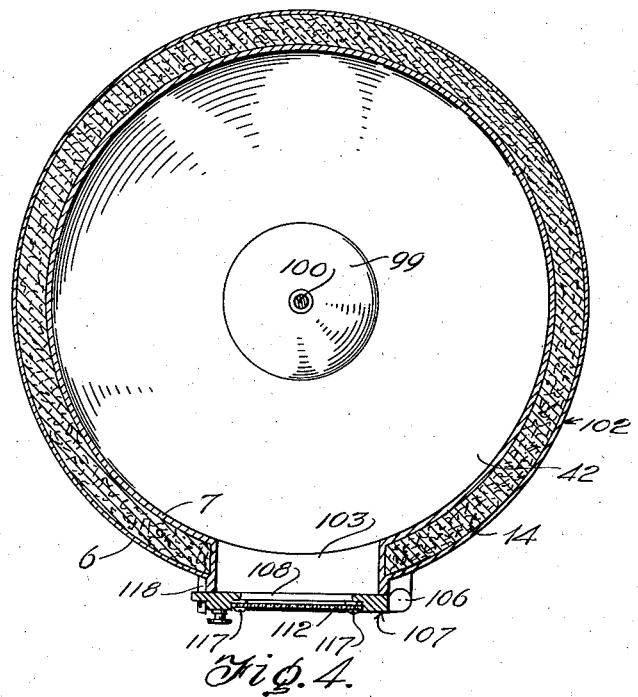
Figure 4:
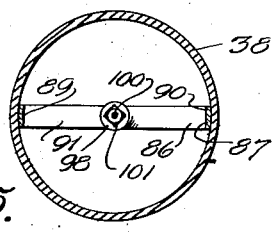
Figure 6:
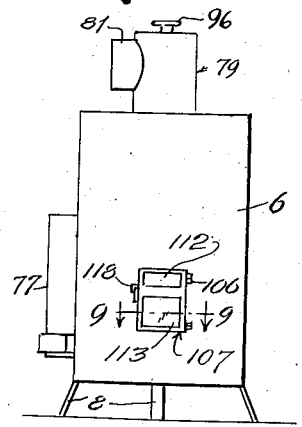
Figure 5:
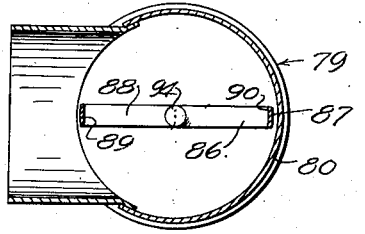

In the drawings:

Figure 1 is a vertical sectional view of the hot water heater,

Figure 2 is a perspective view of the combined soot scraper and deflector element, Figure 3 is a section on line 3—3, Figure 1, Figure 4 is a section on line 4—4, Figure 1, Figure 5 is a section on line 5—5, Figure 1, and Figure 6 is a side elevation of the hot water heater.

The heater includes an outer vertically disposed cylindrical shell 6 open at each end and an inner vertically disposed cylindrical shell 7 open at each end and of less height than the height of shell 6. The lower ends of the shells align and preferably, the thickness of the body of shell 6 will be less than the thickness of shell 7 and is so shown. The shells are disposed in coaxial spaced relation and with the shell 6 extended above the upper end of shell 7.

The shells are mounted on a base structure 8 formed of an annulus 9 having depending therefrom spaced supporting legs 10. The annulus 9 is formed of a horizontal flange 11 and a vertical flange 12 disposed at right angles to each other and with the flange 12 extending upwardly from the outer side of flange 11. The lower ends of the shells are seated on the flange 11 and with the shell 6 abutting the inner face of flange 12. The cross sectional length of flange 11 is greater than the distance between the shells whereby such flange will extend inwardly from shell 7 to provide a ledge, as indicated at 13 for a purpose to be referred to. The space between the shells is filled by a body of suitable insulation, as indicated at 14.

The bodies of the shells 6, 7 are formed with aligned openings 15, 16 respectively, and with aligned openings 17, 18 respectively which are arranged below the openings 15, 16. Secured to the outer face of shell 7 and bordering the opening 16 is a flanged collar 19. Secured to the outer face of shell 7 and bordering the opening 18 is an interiorly threaded flanged collar 20. The openings 15, 16 are arranged on one side of the shells opposite the side of the shells in which the openings 17, 18 are formed. The openings 15, 16 are positioned between the transverse medians and the upper ends of the shells. There is associated with shell 6 a flanged cover or closure member 21 for its upper end and which is mounted on the top edge of such shell, has its flange 22 suitably secured to the outer face of the shell and formed with an enlarged axial opening 23. There is associated with the shell 7 a flanged head member 24 for closing the upper end thereof. The flange 25 of member 24 depends into and is fixedly secured to the inner face of shell 7. The member 24 has an enlarged axial opening 26 which aligns with and is of the same diameter as the diameter of opening 23.

The members 21, 24 are circular and formed with a pair of aligned openings 27, 28 respectively which are spaced adjacent one side of the openings 23, 26 respectively. The members 21, 24 are formed with a pair of aligned openings 29, 30 respectively which are spaced adjacent that side of the openings 23, 26 respectively opposite the side from which the openings 27, 28 are spaced. Secured upon the upper face of member 24 and bordering the opening 28 is an internally threaded flanged collar 31. Secured to the upper face of member 24 and bordering the opening 30 is an internally threaded flanged collar 32, preferably the openings 28 and 30 will be threaded. Arranged between the members 21, 24 is a body of suitable insulation, as at 33, which forms a continuation of the body 14.

Arranged within the shell 7 below and in proximity to opening 18 is a circular flanged bottom member 34. The flange of the latter is indicated at 35 and it is secured to the inner face of the shell 7. The member 34 is formed with a large axial opening 36 which aligns with and is of the same diameter as the diameter of the openings 23, 26. The member 34 is formed with a depending flange 37 which borders the opening 36.

Extending downwardly through the opening 23, body 33, openings 26, 36, as well as snugly bearing against the walls of such openings is a cylindrical heat conducting flue 38. The latter depends below flanges 35 and extends above members 21, 24 and 36 and a seal light joint is provided between the flue and members 24, 36.

The portion of shell 7 and the portion of flue 38 between the members 24, 26, in connection with the said members, provide a water tank or compartment 39. A cold water supply pipe for tank 39 is indicated at 40 and extends downwardly through opening 29, body 33, collar 32 and opening 30 to a point in proximity to member 34. The pipe 40 threadedly engages with collar 32. There is associated with tank 39 a hot water conducting-off pipe 41 which extends upwardly from opening 28, through collar 31, body 33 and opening 27. The pipe 41 has threaded engagement with collar 31.

Arranged within shell 7 below and spaced from the bottom 34 of tank 39 is a funnel-shaped circular header 42 which in connection with tank bottom 34 forms a heat receiving chamber 43a opening into the lower end of flue 38. The header 42 is formed with an axial opening 43, a depending upper flange 44 and a lower flange 45. The flange 44 is secured to the inner face of shell 7. The flange 45 depends from the opening 43.

Mounted on the ledge 13 is a supporting plate 46 formed with an enlarged central opening 47 constituting an air inlet. Positioned over the plate 46 is the base 48 of an oil burner 49. The base 48 has legs 50 which are seated on plate 46.

The burner 49 in connection with the base 48 includes an upstanding oil feed pipe 51 formed with an upwardly inclined lateral branch 52 open at its outer end, an inner or upper pan 53, a lower or outer pan 54, a vertical sleeve 55 forming the inner wall of pan 54 and provided with a top 57 formed with openings 58, legs 59 for supporting and spacing pan 53 from pan 54, legs 60 for supporting pan 54 from base 48, a vertical tube 61 forming the inner wall of pan 53 and extending above sleeve 55, a cap 62 having a conoidal shaped upper part 63 and an annular lower part 64 and a disc 65 at the lower end of cap part 63 for seating on the upper end of tube 61, a body 65a of insulation between the pans 53, 54 and an upstanding vertically adjustable fire tube 66 formed of upper and lower cylindrical portions 67, 68 and an intermediate tapered portion 69. The portion 67 is of less diameter than portion 68. The tube 66 is attached to any suitable means for suspending and adjusting it, by way of example such as shown in my co-pending application Serial No. 73,030 filed April 6, 1936.

The pan 53 is of less diameter than pan 54, of funnel-shaped contour and formed with an axial opening 70. The lower end of tube 61 is integral with and has its inner face form a flush continuation of the edge of opening 70. The pan 54 includes a funnel-shaped body part 71 and an annular rim 72 at the top of part 71. The latter has an axial opening through which extends the sleeve 55. The edge of the axial opening of part 71 of pan 54 is integral with the sleeve 55 between the transverse median of the latter and its lower end. The sleeve 55 is formed with legs at its lower end, as at 73 and such legs are secured to base 48. The legs 60 are secured at their upper end to the outer face of rim 72 and at their lower ends to the base 48. The pipe 51 is spaced from and is disposed axially of the sleeve 55. The branch 52 is disposed intermediate the ends of pipe 51, extends through sleeve 55 and tube 61 and discharges into pan 53. The disc 65 is spaced from the upper end of sleeve 55. The latter encompasses and is spaced from tube 61. The part 64 of cap 62 encompasses and is spaced from the upper end of tube 61. The tube 66 has its portion 67 extend into and is slidable through the flange 45 of header 42. The lower part of said portion 67 and the portion 69 of tube 66 encompasses in spaced relation the major portion of the part 63 of cap 62. The part 68 of tube 66 encompasses in spaced relation the remaining portion of part 63 and the portion 64 of the cap 62. The lower end of tube 66 is positioned in proximity to and is arranged below the portion 64 of cap 62. The pipe 51 extends up through opening 47 in plate 46 and also through base 48 axially thereof. The pipe 51 is to be coupled with a thermostatically controlled float operated oil feed controlling mechanism 74 supported from shell 6. The thermostat which is associated with the mechanism 74 is indicated at 75 and the connection between the thermostat 75 and the mechanism 74 is indicated at 76. A cover 77 is employed for the connection 76. The thermostat 75 extends (Figure 1) through the openings 15, body 14, collar 19 and opening 16 into the water tank or compartment 39. The opening 17, collar 20 and opening 18 forms a clean out for the tank 39 and is normally closed by a plug 78 having threaded engagement with collar 20.

Secured upon the closure 21 for the shell 6 and encompassing the upper end terminal portion of the flue 38 is a tubular bonnet structure 79 including a vertical leg 80 and a horizontal leg 81 which is disposed at right angles with respect to the upper portion of leg 80. The legs are open at each end. The leg 80 at the upper portion of one side thereof is formed with an opening 82 through which extends the leg 81. The inner end of leg 81 is flanged as at 83 and such flange is secured to the inner face of leg 80. The upper end of leg 80 is closed by a cap member 84 which at one side seats on leg 81 and such member is formed with an axial opening 85.

The combined soot scraper and deflector element is indicated at 86 and includes an oblong revoluble suspended scraper member 87 of skeleton form positioned in the bonnet structure 79 and flue 38. The member 87 is of a length to extend from a point in close proximity to the cap member 84 to a point below the lower end of flue 38. The member 87 is formed of metallic strap-like material of the desired gauge and rigidity and includes a top part 88, a pair of side parts 89, 90 and a bottom part 91. The width of member 87 is such as to snugly engage, but such member is capable of being revolved against the inner face of the wall of flue 38 for the purpose of scraping the soot from off of such face on revolving relative to the flue. The side parts 89, 90 of member 87 constitute the scraping means thereof. The top part 88 is formed with a central opening 92 and arranged in the latter is the reduced portion 93 of the operating shaft 94 of element 86. The shaft 94 is upset at its lower end whereby member 87 and the shaft 94 are fixedly secured together. The shaft 94 extends upwardly through the opening 85 of cap member 84 and has fixedly secured on its upper end by the set screw 95 a handle piece 96 to facilitate the revolving of shaft 94. The handle piece 96 seats on cap member 84 and in connection with the shaft 94 suspends member 87 in the heater in a manner as shown in Figure 1. The bottom part 91 of member 87 is formed with a central opening 97 and an annular boss 98 on its upper face.

The element 86 includes a deflector or baffle member 99 of conoidal contour which is suspended in chamber 43ᵃ directly over the opening 43 in header 42. The scraped-off soot will fall directly on the header 42 adjacent the bottom edge of member 99 and be consumed in chamber 42ᵃ. If any of the scraped off soot should fall on member 99 it will be deflected into chamber 42ᵃ and prevented from passing into the fire tube 66 to the burner. The member 99 not only provides a soot deflector, but also a protector for the fire tube 66 and has its lower end of greater diameter than the upper end of the tube 66. The latter and member 99 are arranged in co-axial relation. The member 99 has extending upwardly from its apex thereof a suspension bolt 100 which passes upwardly through opening 97 and boss 98 and carries a retaining nut 101 which seats on boss 98.

The shells 6, 7 and body of insulation 14 constitutes what may be termed the body portion of the heater and which is generally indicated at 102 and of annular contour. The body portion 102 is formed with an opening 103 for access to chamber 43ᵃ and also with an opening, not shown for access to the burner chamber 105. The latter is provided by a part of body portion 102 in connection with the header 42 and plate 46. Hinged to the body portion 102, as at 106 is a skeleton door 107 which is common to the opening 103 and the aforesaid opening not shown for simultaneously closing them. The door 107 has mounted therein transparent vision elements 112, 113 whereby the interior of the chambers 43ᵃ, 105 respectively may be seen. Latching means 118 is provided for door 107.

What I claim is:

1. In a hot water heater, a burner, a water tank, a heat receiving chamber arranged over the tank, a heat receiving chamber arranged below the water tank, said burner and directly below the water tank, said chamber having a funnel-shaped bottom, a fire tube leading from said burner and opening into said chamber axially of the bottom of the latter, a heat conducting flue leading from said chamber and extending through the water tank, a bonnet forming an upward extension of said flue and having an outlet, and a combined revoluble soot scraper and deflector element suspended from said bonnet and extending through said flue into said chamber, the soot scraping part of said element bearing against the inner face of said flue to remove soot therefrom for passage into said chamber for consumption and the soot deflector part of said element being suspended by the said scraping part in co-axial relation with respect to said flue and tube for directing the scraped-off soot into said heat receiving chamber for consumption.

2. In a hot water heater of that type including a burner, a water tank, a heat conducting flue extending through the water tank, a fire tube leading upwardly from said burner towards said flue and a heat receiving chamber arranged between and communicating with said tube and flue, the combination of a bonnet structure forming an upward continuation of the flue, a revoluble combined soot scraping and deflector element suspended from said structure, said element including a part for bearing against the inner face of the flue to scrape off therefrom the soot for consumption in said chamber and a part arranged below the flue and over the upper end of the fire tube for deflecting scraped-off soot for consumption in said chamber to prevent it directly entering the upper end of the fire tube, the said second part being suspended from the lower end of said other part.

3. In a hot water heater of that type including a burner, a water tank, a heat conducting flue extending through the water tank, a fire tube leading upwardly from said burner towards said flue and a heat receiving chamber arranged between and communicating with said tube and flue, the combination of a bonnet structure forming an upward continuation of the flue, a revoluble combined soot scraping and deflector element suspended from said structure, said element including a part for bearing against the inner face of the flue to scrape off therefrom the soot for consumption in said chamber and a part arranged below the flue and over the upper end of the fire tube for deflecting scraped-off soot for consumption in said chamber to prevent it directly entering the upper end of the fire tube, the said second part being suspended from the lower end of the said other part, that part of said element employed for scraping-off the soot being of skeleton form, of oblong contour and bearing at two spaced points thereof throughout the length of the inner face of the flue, and that part of said element for deflecting scraped-off soot being of conoidal contour.

4. In a hot water heater of that type including a burner, a water tank, a heat conducting flue for extension through the water tank, a fire tube leading upwardly from said burner towards said flue and a heat receiving chamber arranged between and communicating with said tube and flue, the combination of a revoluble upstanding scraper for removing the soot from the inner face of the flue for consumption in said chamber, a removed soot deflector suspended from the lower end of the scraper and disposed over the upper end of the fire tube to prevent the soot entering directly into the upper end of the tube, revoluble means for and connected to the upper end of the scraper, and supporting means arranged over said flue for the said revoluble means.

5. In a hot water heater of that type including a burner, a water tank, a heat conducting flue for extension through the water tank, a fire tube leading upwardly from said burner towards said flue and a heat receiving chamber arranged between and communicating with said tube and flue, the combination of a revoluble upstanding scraper for removing the soot from the inner face of the flue for consumption in said chamber, a removed soot deflector suspended from the lower end of the scraper and disposed over the upper end of the fire tube to prevent the soot entering directly into the upper end of the tube, revoluble means for and connected to the upper end of the scraper, and supporting means arranged over said flue for the said revoluble means, said scraper being of skeleton form and of oblong contour, and said deflector being of conoidal contour.

6. In a hot water heater of that type including a burner, a water tank, a heat conducting flue extending through the water tank, a fire tube leading upwardly from said burner towards said flue and a heat receiving chamber arranged between and communicating with said tube and flue, the combination of an upstanding revoluble scraper for removing soot from the inner face of the flue for consumption in said chamber, said scraper being of greater length than the flue for acting on the inner face of the flue from its upper to its lower end, and a deflector for the removed soot suspended from the lower end of the scraper over and in aligned spaced relation with respect to the upper end of the fire tube and acting to prevent the scraped-off soot as it falls from the flue from entering the upper end of the tube.

7. In a hot water heater of that type including a burner, a water tank, a heating conducting flue extending through the water tank, a fire tube leading upwardly from said burner towards said flue and a heat receiving chamber arranged between and communicating with said tube and flue, the combination of an upstanding revoluble scraper for removing soot from the inner face of the flue for consumption in said chamber, said scraper being of greater length than the flue for acting on the inner face of the flue from its upper to its lower end, a deflector for the removed soot suspended from the lower end of the scraper over and in aligned spaced relation with respect to the upper end of the fire tube and acting to prevent the scraped-off soot as it falls from the flue from entering the upper end of the tube, said scraper being formed of a skeleton strap-like body of oblong contour, and said deflector being of conoidal contour.

8. In a hot water heater, a burner, a water tank, a heat receiving chamber arranged above the burner and directly below said tank, a fire tube leading upward from the burner and opening at its upper end into said chamber axially thereof, a heat conducting flue leading from said chamber and extending through said tank, a bonnet forming an upward extension of said flue and having a lateral outlet, a revoluble combined soot scraping and deflecting element including an upstanding soot scraping part extending through said bonnet and tank into the upper part of said chamber for acting on the inner face of the flue for removing soot from said face for passage into the said chamber to be consumed, said element including an upstanding soot deflector depending from the lower end of said scraping part for directing scraped-off soot into said chamber for consumption, said deflector part being of greater diameter than and arranged over the upper end of and in spaced relation to said tube, said deflector part and tube being arranged in co-axial relation, and means mounted on the bonnet and connected to the upper end of said scraping part for revolving and suspending said element.

9. The invention as set forth in claim 8 having said scraping part of skeleton form and of oblong contour, the outer lengthwise edges of said scraping part bearing against the inner face of said flue, and said deflector part being of conoidal contour and having its apex connected to the bottom of the scraper part centrally of the latter.

GEORGE W. WHITEHURST.